United States Patent Office 3,355,145
Patented Nov. 28, 1967

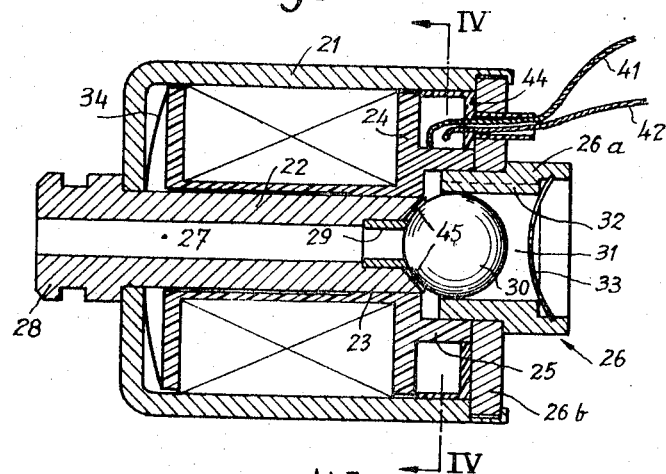
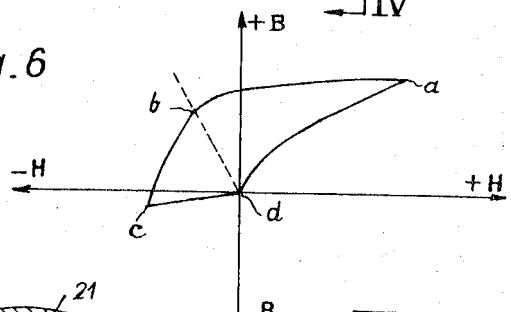
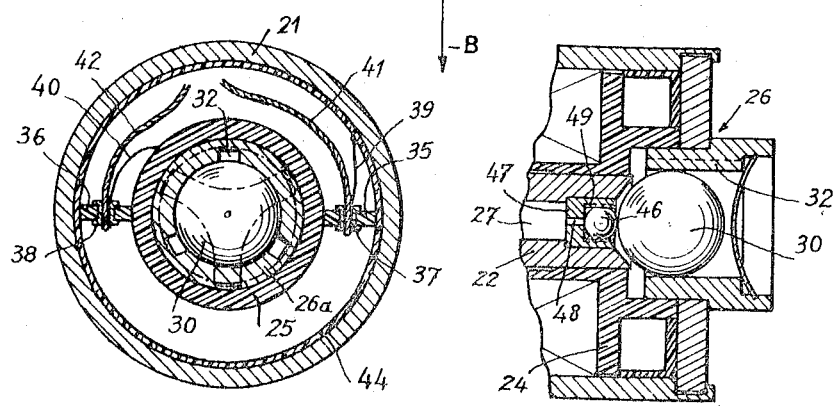

3,355,145
ELECTRICALLY OPERATED VALVES
Gaëtan de Coye de Castelet, Billancourt, France, assignor to Regie Nationale des Usines Renault, Billancourt, France
Filed Oct. 18, 1965, Ser. No. 497,166
Claims priority, application France, Oct. 20, 1964, 992,017, Patent 1,422,165; Oct. 8, 1965, 34,320, Patent 88,831
7 Claims. (Cl. 251—141)

This invention relates to an electrically operated valve design comprising a shell-type electromagnet with a fixed core forming a fluid inlet passage into the valve and a cover formed with a fluid outlet passage, a ball-valve of magnetic material and a seat being interposed between said cover and said core, and the assembly comprising the core, the cover and the seat being further devised in such manner that when the electromagnet is energized the ball-valve closes the magnetic field between the cover and the core, in a position of attraction onto its seat that leaves a certain air gap between the ball and the core.

More specifically the invention has for its object to provide an improved electrically operated valve of this type offering satisfactory efficiency and reliable operation and lending itself to high pressure applications.

Essentially, an electrically operated valve of the aforesaid type according to the invention is characterized in that said seat is formed within the core, at the end of said inlet passage, and in that a housing is provided for the ball-valve which guides the ball along the seat axis and comprises fluid flow passages about the ball-valve, shaped as helical grooves or the like.

It is to be noted in particular that locating the seat within the core leaves the latter with a large useful sectional area for the aforesaid closing of the magnetic field, which in turn ensures good efficiency, rapid response, and, due to the fact that the seat section can be made as small as desired, the possibility of utilization with high fluid pressures, with the standard of fluidtightness obtained— which becomes of primary importance—being reliably ensured by reason of the guidance means and most notably the setting in rotation of the ball-valve each time the electrically operated valve is opened, thus avoiding in particular all deposits on the ball or detrimental marking thereof in operation.

Within the scope of such an electrically operated valve design, the present invention likewise relates to a preferred embodiment for high pressure circuits, wherein the valve comprises two balls. The invention lastly relates to an alternative form of embodiment enabling a memory-type operation to be obtained, as will be explained hereinafter.

A plurality of forms of embodiment of electrically operated valves according to the invention will now be more particularly described with reference to the accompanying non-limitative exemplary drawing, in which:

FIGURE 3 shows in axial section another electrically operated valve according to the invention;

FIGURE 4 is a cross-section on the line IV—IV of FIGURE 3;

FIGURE 5 is a fragmental view in axial section of an alternative form of embodiment utilizing two balls, and FIGURE 6 is a schematic graph of the magnetic states of the circuit of a memory-type electrically operated valve.

Figure 1:
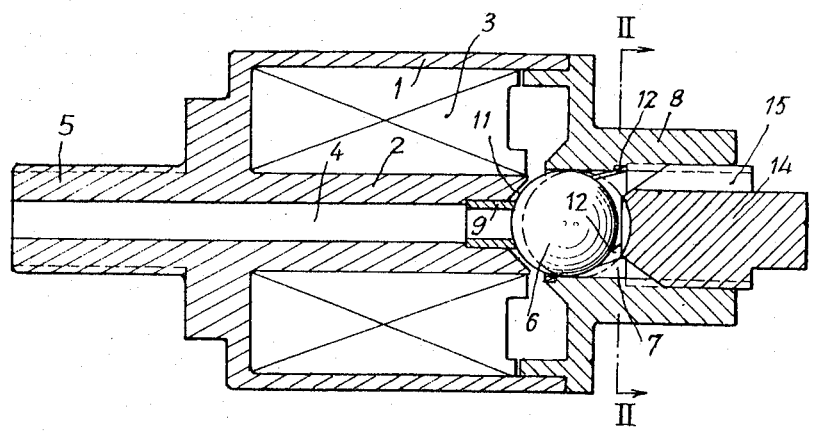
FIGURE 1 shows in axial section an electrically operated valve according to the invention.
Figure 2:
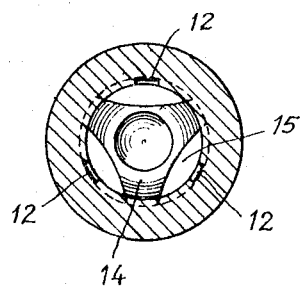
FIGURE 2 is a detail view in cross-section on the line II—II of FIGURE 1.

The electrically operated valve shown in FIGURE 1 comprises a casing of magnetic material of which a portion 1 forms the shell thereof and a portion 2 the core of an electromagnet having a winding 3. The core 2 forms a fluid inlet passage 4 into the electrically operated valve, to which passage is matched a connecting stub 5 on the shell. At the outlet of passage 4, a valve-forming ball 6 is positioned in a housing 7 formed in a cover 8 made of magnetic material, which fits onto the shell 1 and constitutes the second portion of said casing.

The inlet passage 4 is provided with a seat for ball 6 internal to the core and which could be formed directly on the latter but which preferably consists of a fitted part 9 made of non-magnetic material and positioned in such manner as to leave an air gap 11 between said core and the ball when the latter is applied against its seat.

The housing 7 guides the ball along the axis of seat 9 and is formed with passages 12 for flowing the fluid about the ball and which in this case serve to lead the fluid outside the casing of the electrically operated valve.

In addition the passages 12 are formed by helical grooves, so that the fluid flowing along these grooves causes the ball to rotate.

The end closure of housing 7 is formed by an abutment 14 for the ball, which abutment is screwed into the cover and is likewise formed with fluid passages 15 and is preferably made of non-magnetic material.

Thus, when the electromagnet winding 3 is not energized, the fluid admitted into passage 4 repels the ball 6 against its abutment 14 and flows through the passages 12 and 15.

The forced rotation of the ball referred to precedingly modifies the position of the ball each time the valve is opened and prevents it from eventually becoming marked through cooperation with its seat 9. The fluid flowing about the ball also eliminates any impurities which could be deposited and prove troublesome.

When electromagnet winding 3 is energized, ball 6 is attracted towards the core against its seat 9, since it then tends to close the magnetic circuit established in this case between the core and the shell via the cover 8.

The air gap 11 is designed to prevent the ball from sticking to its seat through residual magnetization, as might be the case upon deenergization of the winding were the seat to be formed by the core itself.

Should it be required for the electrically operated valve outlet to be likewise connectable to a fluid pipe, it would suffice for instance for the cover to be formed with a connecting stub surrounding the fluid outlet passage.

Further, the lead-ins (not shown in FIGURE 1) for the wire on winding 3 are in this specific case fluidtight.

The electrically operated valve shown in FIGURES 3 and 4 comprises a casing 21 receiving a separate core 22 upon which is centered as at 23 the electromagnet coil 24. In addition to the customary flanges, the latter is formed with a circular rim 25 whereby to positively locate, relatively to the core, the casing cover 26 which is made up of parts 26a and 26b and adapted to have its periphery driven into said casing. The core 22 is formed with a fluid inlet passage 27 and a connecting stub 28. It supports furthermore, internally and at the end of said passage, a seat 29 for a ball-valve 30. The ball 30 is accommodated in a bore 31 of cover portion 26a which guides the ball along the axis of seat 29 and which is formed with passages 32 for flowing the fluid about the ball, which passages are helically routed grooves. The ball is retained in its housing by a curvilinear triangular abutment 33 driven into and buttressed against the outlet of the bore 31.

The coil 24 is restrained in the casing by means of a spring washer 34. Around the rim 25 it is formed with two diametrically opposed tongues 35 and 36 through which extend bushes 37 and 38 inside which are welded the wires 39 and 40 emerging from the coil, on the one hand, and the wires 41 and 42 for connecting the electrically operated valve, on the other hand. These latter wires pass through the valve cover via a passageway formed in an insulating cap 44 fitted onto the end of the coil about the rim 25.

Casing 21, core 22, cover 26 and ball 30 are made of magnetic material, so that when the electromagnet is energized the ball 30 is urged against the seat 29 into a position which closes the magnetic field, the seat 29 being preferably made of non-magnetic material and being positioned in such manner as to leave about itself an air gap 45 between the ball and the core.

The alternative form of embodiment shown in FIGURE 5 differs from the embodiment described precedingly essentially in that the ball-valve consists of two balls, of which one, 30, is similar to that previously described and responds to energization of the electromagnet by closing the magnetic field between cover 26 and core 22, and this ball 30 cooperates with a further ball 46 of smaller diameter positioned within the core and cooperating in turn, as an obturator, with a seat 47 inserted into the core at the end of inlet passage 27.

Preferably, the seat 47 is devised as shown in the form of a ring which receives the ball 46 and is formed with an inward rim which has a fluid passage hole 48 therein and which serves to obturate this ball. Further, the interior of this ring forms a ball guiding conduit and is provided further with passages 49 for flowing the fluid about the ball, provided in the form of helically routed grooves, the function of which is similar to that of the grooves 32 surrounding ball 30.

In accordance with a specific feature of this invention, the electrically operated valve designs described hereinabove lend themselves readily to memory-type operation. To that end, part of the magnetic circuit, for instance the core 22 or the ball 30, is not made of magnetically soft material such as iron, but of a magnet-type material of high residual-flux density and low coercive field. This makes it possible to attract the ball with a high current inrush, with the wire 41 being made positive for instance relatively to the wire 42. When the current is cut off the ball will remain attracted and the electrically operated valve closed. In order to open it, all that would be necessary would be a weak reverse current pulse for rendering the wire 41 negative relatively to the wire 42 and of duration sufficient for the ball to have time to shift responsively to the restored flow of fluid.

FIGURE 6 represents a schematic graph of the magnetic states of the circuit, assuming the ball to be on its seat 9, with the magnetizing or demagnetizing field H being plotted along the X-axis and the induction B along the Y-axis.

Respectively to the heavy inrush current attracting the ball, the operating point shifts to $a$, then, when the current is cut off, it moves to $b$ due to the effect of the parasite air gaps. In response to the weak valve-opening reverse pulse, the operating point shifts to $c$ and the ball then lifts off its seat, with the operating point finally moving to $d$. In point of fact, however, if the ball were not assumed to be on its seat when the heavy inrush current flows, the locus from $d$ to $a$ would be more complex than shown.

In this alternative form of embodiment, it could then be advantageous to make seat of magnetic material.

What is claimed is:
1. A ball-type electrically operated valve comprising a shell-type electromagnet with a fixed core forming a fluid inlet passage into the electrically operated valve and a cover embodying a fluid outlet passage, a ball-valve made of magnetic material and a seat being interposed between said cover and said core, and the assembly consisting of said core, cover and seat being so devised that when the electrically operated valve is energized said ball-valve closes the magnetic field between said cover and said core in a position of attraction against said seat that leaves a certain air gap between said ball valve and said core, characterized in that said seat is formed internally of said core at the end of said inlet passage and in that a housing for said ball-valve provides guidance therefor along the seat axis and comprises passages for flowing the fluid about said ball-valve, said passages being shaped to cause rotation of the ball in response to flow.

2. An electrically operated valve according to claim 1, wherein said ball-valve comprises two balls, of which one is accommodated in said core and acts as an obturator and is of smaller diameter than the other ball which is housed in said cover and adapted to effect said closure of the magnetic field and thrusting of the obturating ball into its closed position.

3. An electrically operated valve according to claim 2, wherein the housings of said two balls comprise fluid flow passages.

4. An electrically operated valve according to claim 3, wherein the housing of said obturating ball is said seat, which is fitted into said core.

5. An electrically operated valve according to claim 1, having an electromagnet coil positively centered upon said core, wherein said coil is formed with a rim for positively locating the central cover portion acting as a ball-guide and fluid outlet passage.

6. An electrically operated valve according to claim 1, wherein said core, said ball-valve, and said cover define a magnetic circuit and one of said core and said ball-valve is made of a magnetic material having a residual magnetization such that said ball-valve is urged into its obturating position by a pulse of magnetizing current of determinate direction, and subsequently into its open position by a pulse of demagnetizing current of opposite direction.

7. An electrically operated valve according to claim 6, wherein said part of the magnetic circuit has high residual-flux density and low coercive field.

References Cited
UNITED STATES PATENTS

| | | | |
|---|---|---|---|
| 850,738 | 4/1907 | Dempster | 251—139 X |
| 954,178 | 4/1910 | Fowler | 137—331 |
| 1,555,068 | 9/1925 | Nixon | 137—331 |
| 2,391,017 | 12/1945 | Grontkowski | 251—141 |
| 2,828,936 | 4/1958 | Hales | 251—141 X |
| 3,023,576 | 3/1962 | Musgrave | 251—65 X |
| 3,180,354 | 4/1965 | Grose | 251—65 X |
| 3,245,652 | 4/1966 | Roth | 251—141 X |

FOREIGN PATENTS 220,043   3/1910   Germany.

M. CARY NELSON, *Primary Examiner.*
R. C. MILLER, *Assistant Examiner.*